April 14, 1959 W. PEARLMAN 2,882,522
AMPLITUDE COMPARATOR CIRCUIT
Filed May 31, 1956
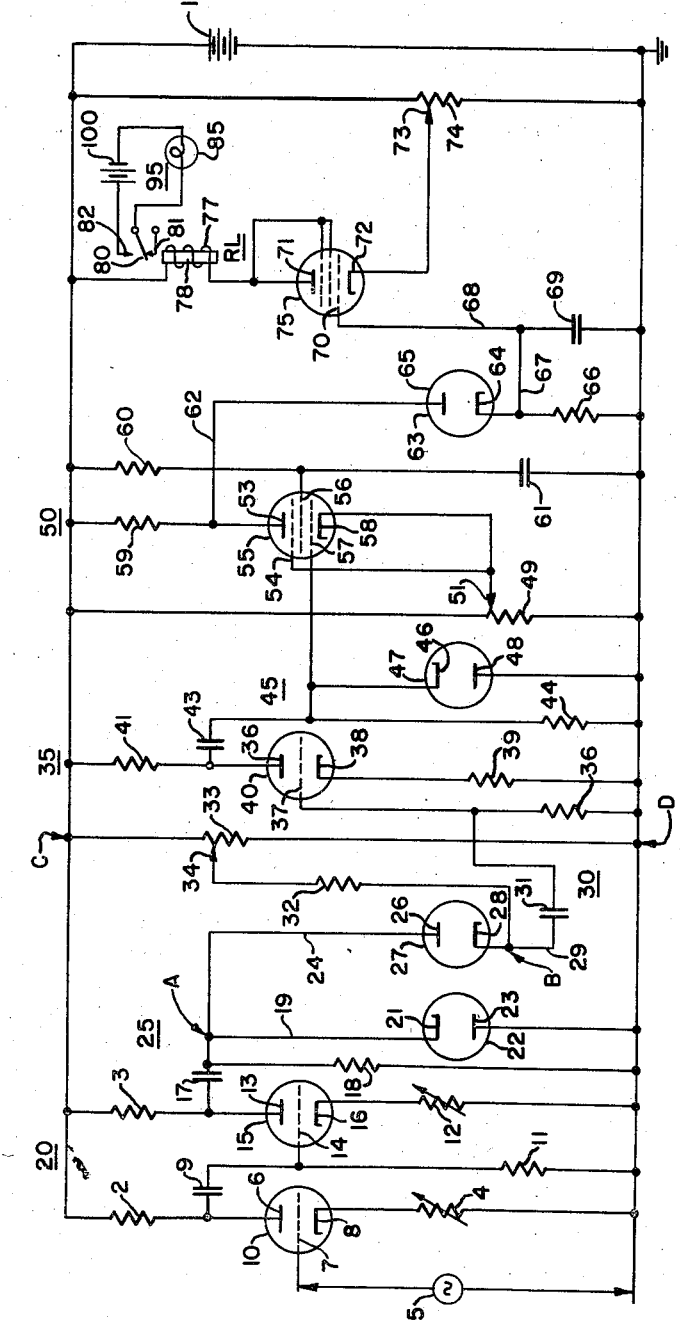
INVENTOR
W. PEARLMAN
BY
ATTORNEYS United States Patent Office 2,882,522

Patented Apr. 14, 1959

1

2,882,522

AMPLITUDE COMPARATOR CIRCUIT

William Pearlman, Silver Spring, Md., assignor to United States of America as represented by the Secretary of the Navy Application May 31, 1956, Serial No. 588,585

7 Claims. (Cl. 340—253)

(Granted under Title 35, U.S. Code (1952), sec. 266)

The invention described herein may be manufactured and used by or for the Government of the United States of America for governmental purposes without the payment of any royalties thereon or therefor.

The present invention relates to voltage testing apparatus of the amplitude comparator type and more particularly pertains to an electronic circuit combination for reliably comparing the amplitude level of an A.C. signal with an amplitude reference level established by a D.C. source for effectuating operation of an output indicator circuit upon the occurrence of a predetermined relationship therebetween.

For many applications such, for example, in the manufacture of electronic equipment, aircraft instrumentation, servomechanisms, fire control systems, computer circuits and electrical translating devices; it is generally desirable to expeditiously determine, at a glance by suitable indicating means, whether a sample A.C. voltage, appearing in the output circuit or in a predetermined section of any of the aforementioned apparati, is greater or less than a desired voltage value which value may be the value required by the specification of the apparatus for its intended utility. In attaining this objective, the present invention proposes to provide an amplitude comparator circuit for comparing the sample A.C. voltage with a datum D.C. voltage and therewith affecting the operation of an indicator in a manner correlative with the compared voltages.

Heretofore, various types of amplitude comparator circuits have been utilized extensively for performing the function of comparing two voltages. One prior art arrangement is a paraphase difference amplifier in which a pair of triodes are arranged to form a bridge circuit with the signals to be compared being applied to the grids thereof, this type of voltage comparator being characterized by limited sensitivity.

Other voltage comparator arrangement previously employed have been of the phase-sensitive thyratron type, of the trigger type circuits in conjunction with a relay, and of the simple vacuum tube addition type circuits. Although satisfactory for general utility, the phase-sensitive thyratron arrangements leave much to be desired, where a high degree of reliability is deemed necessary, due to their nonuniformity of characteristics. The trigger and addition type circuits require the application of trigger voltages that are proportional to the sample voltages, thereby necessitating the utilization of D.C. amplifiers which possess the undesirable characteristics of inherent drift and shift of reference level when several stages of amplification are used.

The general purpose of this invention is to avoid the foregoing and other difficulties in, and objections to, the prior art practices by the provision of a voltage comparator circuit which is characterized by its stability, relative simplicity, and positive operation in its action of determining the relationship between an alternating current signal and a datum direct current signal.

2

In accordance with a preferred embodiment of the invention, there is provided a voltage comparator circuit which employs a combination polarity and amplitude discriminating circuit arrangement, consisting of a diode clamping circuit succeeded by a diode clipping circuit, the discriminating circuit arrangement having an alternating current signal applied to the input side thereof and the diode clipping circuit being selectively biased from the direct current operating potential source of the comparator circuit through an adjustable divider network, the selective bias serving as the reference direct current voltage with which the amplitude of the alternating current signal is compared.

The function of the clamping circuit is to by-pass to ground a predetermined half-cycle of the alternating current signal whereby only the other half-cycle of the alternating current signal is presented to the diode clipping circuit. The diode clipping circuit remains responsively nonconductive until the amplitude of the aforestated other half-cycle exceeds the bias applied to the diode clipping circuit, whereupon the clipping circuit becomes conductive to pass that portion of the aforestated other half-cycle exceeding the amplitude of the reference direct current voltage thereby deriving an output differential voltage which is correlative to the amount the amplitude of the alternating current signal exceeds the amplitude of the reference direct current voltage.

An output relay tube, which controls the indicator circuit, is responsive to the derived differential voltage to actuate the indicator circuit. The output relay tube may be normally conductive and rendered nonconductive in response to the derived differential voltage in effectuating its indicator circuit controlling function; or, conversely, the output relay tube may be initially nonconductive and operatively rendered conductive in response to the derived differential voltage. In the event the amplitude of the alternating current signal is less than the reference direct current voltage, there is no output voltage from the clipping circuit, and the conductive condition of the output relay tube is undisturbed, thereby being ineffective to actuate the indicating circuit, the absence of actuation thereof indicating that the amplitude of the alternating current signal is less than the datum amplitude level provided by the reference direct current voltage.

A variation of the preferred embodiment of the invention may be effected by utilizing a separate D.C. source as the reference voltage in lieu of the aforedescribed divider network in combination with the comparator circuit operating potential. In this arrangement, the separate D.C. source may be selectively adjustable to provide desired amplitude datum levels or may be a continuously varying D.C. signal with which a continuously varying A.C. signal is compared.

A further object of the invention is the provision of new and improved electronic apparatus for comparing the amplitude of an A.C. signal with a D.C. signal.

Another further object is to employ, in a voltage comparator circuit, a D.C. potential as a datum amplitude level with which an A.C. signal of undetermined amplitude is compared.

A primary object of the invention is to provide voltage comparing and indicating apparatus for reliably indicating, with a high degree of resolution, whether a sample A.C. potential is greater or less than a predetermined value by developing an amplified difference voltage to trigger a relay circuit only when the sample potential is greater than the predetermined value.

A specific object of the invention is the provision, in a voltage magnitude comparator circuit, of polarity and amplitude discriminating means for passing current of predetermined polarity which exceeds a reference amplitude level.

Still further objects and the entire scope of applicability of the present invention will become apparent from the detailed description given hereinafter; it should be understood, however, that the detailed description and specific examples, while indicating preferred modes of the invention, are given by way of illustration only, since various changes and modifications within the spirit and scope of the invention will become apparent to those skilled in the art from this detailed description.

The figure is a schematic wiring diagram of the preferred embodiment of the invention, with reference letters denoting the junctions between which the circuit may be modified to provide another embodiment.

Referring now to the figure, wherein is shown the schematic diagram of a voltage comparator circuit in accordance with a preferred embodiment of the invention, a source of direct current 1 provides the operating potential for the comparator circuit and, in addition, functions in combination with a divider network, formed by potentiometer 33 and resistor 32 and more fully to be described hereinafter, to provide the reference direct current voltage with which an alternating current signal source 5 of undetermined amplitude is to be compared in order to determine whether the magnitude of the signal source 5 is greater or less than a desired value, which desired value is established by the aforestated reference direct current voltage as a datum amplitude level. The signal source 5 is applied to a dual amplification input circuit denoted generally by reference numeral 20 and consisting of triodes 10 and 15, with the signal source 5 being connected between the control grid 7 and cathode 8 which is connected to ground through variable resistor 4, the cathode 16 of triode 15 being similarly connected to ground through variable resistor 12. The anode 6 of triode 10 is connected to apply the amplified output therefrom through coupling condenser 9 to control grid 14 which is biased by resistance 11, the operating potential for triodes 10 and 15 being supplied thereto from source 1 through plate resistances 2 and 3.

Connected directly across source 1 is a potentiometer 74 having an adjustable wiper 73 connected to cathode 72 of pentode 75 for maintaining the cathode 72 above ground level, the pentode 75 functioning as a triode by virtue of the direct connection of the suppressor and screen grids to anode 71. The pentode, which is normally maintained conductive by means to be subsequently described, serves as an output relay control tube which controls the operation of a relay, indicated generally at RL. As long as tube 75 is in the conductive condition, current continuously flows through relay winding 77, and relay core 78 remains energized to attract and maintain movable contact arm 80 in engagement with fixed contact 81 which is electrically unconnected, thereby holding an indicator circuit 95, which includes an energizing source 100 and an indicator 85 in an open-circuited condition. When relay tube 75 is rendered nonconductive, no current flows through winding 77, and core 78 is deenergized to release contact arm 80 so as to engage fixed contact 82 to thereby close indicator circuit 95 whereupon indicator 85 is energized from source 100 to indicate the nonconductive condition of relay control tube 75 and hence the fact that signal source 5 exceeds the predetermined amplitude reference level.

It is to be understood that, although a relay and a luminous type indicator have been described, these devices are only exemplary expedients and that the invention is not to be construed as being limited to the utilization of these devices since any type of electro-responsive device and electronic indicator can be readily employed in lieu of the relay and luminous indicator, respectively, without departing from the spirit and scope of the present invention. Also, although the output relay tube 75 is normally conductive as herein described and as illustrated in the preferred embodiment of the invention, it is to be understood that relay tube 75 can be arranged to be normally nonconductive to maintain an indicator circuit, suitably associated therewith, indicatively ineffective until the relay tube 75 is rendered conductive. In other words, the relay tube 75 with its associated indicator circuitry can be arranged to operate conversely from the hereinabove described manner of the preferred modus operandi. This can be simply effected by applying a negative bias to control grid 70 to maintain tube 75 nonconductive and utilizing an additional inverter for applying a positive triggering pulse to control grid 70 to initiate conduction of the tube 75. As is obvious to those skilled in the art, after understanding the invention, there are many other ways of accomplishing this operation.

Referring now to the preferred embodiment, the source 1 also applies operating potential through a plate resistance 59 to an inverter amplifier tube 55, the inverter amplifying stage being generally indicated by reference numeral 50, and to a bias producing rectifier 65 having its anode 63 connected by conductor 62 to resistor 59 and its cathode 64 connected through load resistor 66 to ground, the high potential end of resistor 66 being connected by leads 67—68 to control grid 70 of tube 75 thereby to apply to the control grid 70 a positive bias produced by rectifier 65 and appearing across load resistor 66. This positive bias is of such magnitude as to place the potential of control grid 70 above the potential of cathode 72 whereby tube 75 is maintained in a conductive condition as long as rectifier 65 conducts current supplied thereto from source 1.

The inverter amplifier 55 functions in response to a triggering pulse applied to its control grid 57 in a manner to be hereinafter described, to produce in its plate circuit a large time-average negative pulse which renders rectifier 65 nonconductive for a duration corresponding to the width of the negative pulse. While rectifier 65 is nonconductive, there is no positive bias applied to control grid 70 of tube 75; and tube 75, due to control grid 70 being driven negative with respect to cathode 72, becomes nonconductive to actuate indicator circuit 95 as hereinabove described.

Returning now to the input side of the comparator circuit, the alternating current signal from source 5 is amplified by input circuit 20 and applied to a conventional negative clamping circuit, indicated generally by reference numeral 25 and consisting of an R-C coupling circuit 17—18 in conjunction with diode 22, the negative clamping circuit 25 functioning as a conventional negative clamping circuit to present a conductive path to the negative half-cycles of the alternating current input signal for by-passing these negative half-cycles to ground so as to present only the positive half-cycles at terminal A.

A conventional clipping circuit, generally denoted by reference numeral 30, comprises a diode 27 having its anode 26 connected to terminal A and a divider network, consisting of potentiometer 33 and resistor 32, interconnecting cathode 28 of diode 27 to direct current source 1. The divider network in combination with the potential of source 1 provides an adjustable positive bias arrangement for establishing a selective threshold level on diode 27 which threshold level corresponds to a desired or predetermined amplitude reference level with which the amplitude of the positive half-cycles appearing at terminal A is to be compared.

Now, if the amplitude of the positive half-cycles appearing at terminal A is less than the selected threshold level established on diode 27, the diode 27 remains nonconductive and no current appears in the output thereof. Consequently, the subsequent stages of the comparator are unaffected and the output relay tube 75 is ineffective to actuate the indicator circuit 95. On the other hand, if the amplitude of the positive half-cycles appearing at terminal A exceeds the threshold level established on diode 27, the diode 27 remains nonconductive for that portion of each positive half-cycle which is less than the aforesaid threshold level and that becomes conductive to pass that portion of each positive half-cycle which exceeds the aforesaid threshold level to derive a rectified difference voltage, of positive polarity in the output thereof, which is representative of the amount the amplitude of each positive half-cycle exceeds the threshold, or datum, level.

In the aforedescribed manner, the clamping circuit 25 in conjunction with the clipping circuit 30 function as a polarity and amplitude discriminating circuit.

From the foregoing, it is obvious that, when a sample alternating current does not exceed a desired magnitude, no voltage appears in the output of clipping circuit 30; whereas, when a sample alternating current does exceed a desired magnitude, the clipping circuit 30 derives a rectified difference voltage pulse of positive polarity which is correlative to the difference between the amplitude of a positive half-cycle of the sample voltage and a datum voltage.

The derived difference voltage pulse is applied through coupling condenser 31 to control grid 37 of a triode 40 which constitutes a difference voltage amplifier and inverter, indicated generally by reference numeral 35. Grid bias is provided by resistor 36 and the cathode 38 is connected to ground through resistor 39, the operating potential being applied through plate resistance 41. The inverted and amplified difference voltage pulse is then applied to a negative clamping circuit 45, consisting of R-C coupling circuit 43—44 and diode 47. The clamping circuit 45 clamps the negative peaks to ground so as to produce a large time-average positive pulse for each inverted difference voltage pulse applied to the clamping circuit. This large time-average positive pulse has a long time base relative to the difference voltage pulse and, when applied to inverter amplifier 55, causes inverter amplifier 55 to produce in the output thereof a negative pulse which has a long duration relative to its respective difference voltage pulse appearing in the output of clipper 30. Hence, in this manner, relay tube 75, by virtue of the fact that the aforesaid negative pulse renders bias producing rectifier 65 nonconductive, is cut-off for a long period of time relative to the aforesaid difference voltage pulse, whereby spontaneous operation of tube 75 due to a series of voltage difference pulses is prevented. As stated heretofore, cutting-off tube 75 actuates the indicator circuit 95 to light up indicator 85.

It is to be understood that the described and illustrated comparator may be modified to compare the negative half-cycles of the alternating current source instead of the positive half-cycles merely by reversing the anode-cathode connections of diodes 22, 27, 46 and 65.

The preferred embodiment illustrated in the figure may be modified so as to employ a separate direct current source to provide the datum amplitude level. This separate source may be of the selectively adjustable type or may be a continuously varying direct current output from an electronic system or section of an electronic system, which direct current output may be, for one reason or another, desired to be compared with an alternating current output produced by the same, or another, electronic system or system section. In order to modify the schematic circuit illustrated in the figure to render it compatible for use with a separate direct current source, the potentiometer 33 connected between terminals C and D is disconnected from terminals C and D and removed from the circuit; and, resistor 32 is also eliminated from the circuit by disconnecting it from terminal B. Thus, diode 27 is no longer biased by source 1. The separate direct current source for establishing the datum amplitude level is inserted in the circuit by connecting the positive side thereof to terminal B and the negative side thereof to terminal D, thereby providing the positive bias required for diode 27 to operate as a clipper.

From the foregoing, it is apparent that the invention provides a comparator for expeditiously and reliably indicating, with a high degree of resolution, whether a sample alternating current voltage is greater or smaller than a desired value, by developing an amplified difference voltage to trigger an output relay control tube only when the sample voltage is greater than desired.

Obviously many modifications and variations of the present invention are possible in the light of the above teachings. It is therefore to be understood that, within the scope of the teachings herein and the appended claims, the invention may be practiced otherwise than as specifically described.

What is claimed as new and desired to be secured by Letters Patent of the United States is:

1. In apparatus for determining the amplitude of an applied input alternating current signal relative to a datum amplitude level established in the apparatus, a voltage comparator comprising a polarity discriminating clamping circuit for presenting a conductive path to alternate half-cycles of predetermined polarity of said input signal and a non-conductive path to the other half-cycles of opposite polarity of said input signal, said clamping circuit including a unilateral conductive device poled to conduct current of predetermined polarity, an amplitude discriminating circuit for presenting a conductive path solely to that portion of the amplitude waveform comprising said other half-cycles which exceeds said datum amplitude level, said polarity discriminating circuit and said amplitude discriminating circuit having a common input terminal to which said input signal is applied, circuit means operatively associated with said amplitude discriminating circuit including indicator means electrically connected to indicatively respond to the conductive condition of said amplitude discriminating circuit, and a source of reference potential establishing said datum amplitude level and connected to said amplitude discriminating circuit in conductive opposition to the application thereto of said other half-cycles of said input signal whereby said amplitude discriminating circuit functions to block individual passage therethrough of each of said other half-cycles until the amplitudes of their respective waveforms exceed the datum amplitude level established by said source thereby to develop discrete differential voltages to which said circuit means are responsive.

2. The apparatus of claim 1, wherein said amplitude discriminating circuit is a clipping circuit including a unilateral conductive device poled to conduct current of a polarity opposite to said predetermined polarity.

3. The apparatus of claim 2, wherein said unilateral conductive devices are diodes, the cathode of said clamping circuit diode and the anode of said clipping circuit diode being connected to said common input terminal, and wherein said reference potential source is connected to the cathode of said clipping circuit in polarity opposition to the polarity presented by said other half-cycles to the anode of said clipping circuit diode.

4. The apparatus of claim 3, wherein said circuit means further includes an inverter for inverting said discrete differential voltages, clamping means responsive to said inverted voltages to produce large time average pulses of a polarity opposite to the polarity of said inverted voltages, and rectifier means for producing triggering impulses from said pulses to render said indicator means indicatively responsive to the conductive condition of said amplitude discriminating circuit.

5. A voltage comparator comprising, in combination, a direct current voltage source, adjustable means coupled to said source for selectively establishing a predetermined amplitude reference level, an alternating current signal source having an undetermined amplitude level to be compared with said amplitude reference level, polarity and amplitude discriminating circuit means intercoupling said signal source and said adjustable means for comparing the undetermined amplitude level of predetermined alternate half-cycles of said signal source with said reference level, said circuit means including a series diode clipper biased by said adjustable means to a threshold level corresponding to said amplitude reference level and being responsive to that portion of the waveform of said predetermined half-cycles which exceeds said threshold level to derive rectified voltages representative of the difference between said amplitude reference level and the undetermined amplitude level of said predetermined half-cycles, a control circuit responsive to the output of said clipper, and indicator means controlled by said control circuit for indicating the appearance of said derived rectified voltages in the output of said clipper.

6. A voltage comparator comprising, in combination, a direct current voltage source, adjustable means coupled to said source for selectively establishing a predetermined amplitude reference level, an alternating current signal source having an undetermined amplitude level to be compared with said amplitude reference level, polarity and amplitude discriminating circuit means intercoupling said signal source and said adjustable means for eliminating the negative half-cycles of said signal source and comparing the undetermined amplitude level of the positive half-cycles of said signal source with said reference level, said circuit means including a series diode clipper biased by said adjustable means to a threshold level corresponding to said amplitude reference level and being responsive to that portion of said positive half-cycles which exceeds said threshold level to derive positive pulses representative of the difference between said amplitude reference level and the undetermined amplitude level of said positive half-cycles, a difference amplifier for amplifying and inverting said positive pulses to produce amplified negative pulses in the output thereof, a negative clamping circuit connected to the output of said amplifier for clamping the negative peaks of said negative pulses to ground to thereby develop large time average positive pulses from said negative pulses, control means for deriving trigger pulses from said large time average positive pulses, and indicator means actuated in responsive to said trigger pulses for indicating that the amplitude level of said signal source exceeds said reference amplitude level.

7. The comparator of claim 6, wherein said control means includes a normally conductive output relay tube having at least an anode, a cathode and a control grid, relay means having the winding thereof connected in the anode circuit of said output tube and energized from current passing through the anode-cathode circuit of said output tube while said tube is in the normally conductive condition, said relay means being operative upon de-energization thereof due to said output tube being rendered nonconductive to actuate the indicator means, an inverter amplifier connected to receive and invert said large time average positive pulses to produce in the output thereof large time average negative pulses, and biasing means interconnecting the output of said inverter amplifier and the control grid of said output relay for applying positive bias to the control grid of said output tube in the absence of output signals from said inverter amplifier to thereby maintain said output tube normally conductive, said biasing means being effective in response to said large time average negative pulses to apply a relatively long time negative bias of such magnitude to said control grid as to drive said control grid negative with respect to said cathode to thereby render said output tube nonconductive whereby said relay means is de-energized to operatively actuate said indicator means.

References Cited in the file of this patent
UNITED STATES PATENTS

| | | |
|---|---|---|
| 2,101,207 | Williamson | Dec. 7, 1937 |
| 2,263,932 | Schnoll | Nov. 25, 1941 |
| 2,369,678 | McWhirter | Feb. 20, 1945 |
| 2,505,072 | Sunstein | Apr. 25, 1950 |
| 2,676,253 | Ayres | Apr. 20, 1954 |
| 2,715,723 | Webster | Aug. 16, 1955 |
| 2,719,289 | Batstow | Sept. 27, 1955 |
| 2,752,589 | De Long | June 26, 1956 |
| 2,773,252 | Noxon et al. | Dec. 4, 1956 |